US012726428B2

(12) United States Patent
Liu et al.

(10) Patent No.: US 12,726,428 B2
(45) Date of Patent: Sep. 1, 2026

(54) MULTICAST PACKET SENDING METHOD, APPARATUS, AND SYSTEM

(71) Applicant: HUAWEI TECHNOLOGIES CO., LTD., Shenzhen (CN)

(72) Inventors: Shuying Liu, Beijing (CN); Huizhi Wen, Beijing (CN); Zuqing Li, Shenzhen (CN); Fanghong Duan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 714 days.

(21) Appl. No.: 18/099,669

(22) Filed: Jan. 20, 2023

(65) Prior Publication Data

US 2023/0155921 A1 May 18, 2023

Related U.S. Application Data

(63) Continuation of application No. PCT/CN2021/107745, filed on Jul. 22, 2021.

(30) Foreign Application Priority Data

Jul. 22, 2020 (CN) ......................... 202010711407.0

(51) Int. Cl.
*H04L 45/16* (2022.01)
*H04L 45/00* (2022.01)
*H04L 47/32* (2022.01)

(52) U.S. Cl.
CPC .............. *H04L 45/16* (2013.01); *H04L 45/22* (2013.01); *H04L 47/32* (2013.01)

(58) Field of Classification Search
CPC ......... H04L 45/16; H04L 45/22; H04L 47/32; H04L 45/28; H04L 12/1886;
(Continued)

(56) References Cited

U.S. PATENT DOCUMENTS

2009/0268607 A1 10/2009 Wang et al.
2013/0021896 A1* 1/2013 Pu ....................... H04L 12/1863 370/216

(Continued)

FOREIGN PATENT DOCUMENTS

CN 101827025 A 9/2010

OTHER PUBLICATIONS

Xu Xiongbin, A Dual_redundancy Network Quick Switching Method, Ship Electronic Engineering, vol. 38 No. 11, Nov. 30, 2018, total 4 pages.

*Primary Examiner* — Kibrom T Hailu
(74) *Attorney, Agent, or Firm* — WOMBLE BOND DICKINSON (US) LLP

(57) ABSTRACT

This application describes a multicast packet sending method, apparatus, and system. The method includes a first multicast root node and a second multicast root node belonging to a same VRRP group. The first multicast root node receives a first multicast packet from a specified multicast source, and the second multicast root node receives a second multicast packet from the same specified multicast source, where the first multicast packet and the second multicast packet include same multicast data. The first multicast root node sends the first multicast packet to a first node based on the first multicast root node being a master root node. The second multicast root node discards the second multicast packet based on the second multicast root node being a backup root node. The method reduces waste of a network bandwidth resource.

20 Claims, 4 Drawing Sheets

(58) Field of Classification Search
CPC . H04L 12/403; H04L 45/48; H04L 12/40176; H04L 12/1845; H04L 45/74; H04L 47/825
See application file for complete search history.

(56) References Cited

U.S. PATENT DOCUMENTS

2016/0112255 A1* 4/2016 Li ....................... H04L 41/0803 709/220
2017/0289216 A1 10/2017 N et al.
2018/0054391 A1* 2/2018 Jain ......................... H04L 45/24

* cited by examiner

MULTICAST PACKET SENDING METHOD, APPARATUS, AND SYSTEM

CROSS-REFERENCE TO RELATED APPLICATIONS

This application is a continuation of International Application No. PCT/CN2021/107745, filed on Jul. 22, 2021, which claims priority to Chinese Patent Application No. 202010711407.0, filed on Jul. 22, 2020. The disclosures of the aforementioned applications are hereby incorporated by reference in their entireties.

TECHNICAL FIELD

This application relates to the communications field, and in particular, to a multicast packet sending method, apparatus, and system.

BACKGROUND

A multicast technology implements efficient point-to-multipoint transmission of a multicast data stream, thereby saving a large amount of network bandwidth and reducing network load. Therefore, the multicast technology is widely used, for example, in a live online video, a web television, and a remote conference. For some services that have relatively high requirements on network real-time performance and reliability, for example, an Internet Protocol television (IPTV) live online video, reliability protection of a multicast root node is very important. Once the multicast root node fails, a network is severely affected. A conventional solution of protecting a multicast root node is to deploy two multicast root nodes, where one of the two multicast root nodes is a master root node, and the other is a backup root node. When the master root node fails, a multicast data stream is switched to the backup root node, and the backup root node transmits the multicast data stream in place of the master root node.

However, the master root node sends the multicast data stream to a leaf node through a master path, and the backup root node sends the same multicast data stream to the leaf node through a backup path. If the master path fails, the leaf node forwards the multicast data stream from the backup path to a terminal device. A problem of this manner is that many network resources are occupied.

SUMMARY

This application provides a multicast packet sending method, apparatus, and system, to reduce waste of a network resource.

According to a first aspect, this application provides a multicast packet sending method. The method includes: A first multicast root node receives a first multicast packet from a specified multicast source, and a second multicast root node receives a second multicast packet from the same specified multicast source. The first multicast root node and the second multicast root node belong to a same virtual router redundancy protocol VRRP group. The first multicast packet and the second multicast packet include same multicast data. The first multicast root node sends the first multicast packet to a first node based on a fact that the first multicast root node is a master root node. The second multicast root node discards the second multicast packet based on a fact that the second multicast root node is a backup root node. A VRRP mechanism is used to elect a network device to undertake transmission of a multicast packet, thereby not only ensuring reliable communication of a network, but also reducing waste of a network bandwidth resource.

In a possible embodiment, an address of the first multicast root node is different from an address of the second multicast root node. For example, an IP address of the first multicast root node is different from an IP address of the second multicast root node.

In a possible embodiment, before the first multicast root node sends the first multicast packet to the first node, the first multicast root node determines that an interface for receiving the first multicast packet is the same as an inbound interface corresponding to a first forwarding entry. The first forwarding entry is a forwarding entry corresponding to an address in the first multicast packet. The multicast packet address is a multicast source address or a multicast group address, or a multicast source address and a multicast group address. Unicast routing entries or multicast routing entries are searched for based on the address carried in the multicast packet, and an optimal routing entry is selected from these routing entries as an RPF routing entry. If an interface at which the packet actually arrives is the same as an interface in the RPF routing entry, an RPF check succeeds, and a multicast routing entry is created. Otherwise, the RPF check fails, and the multicast packet is discarded. By checking the first multicast packet, the first multicast root node may be prevented from forwarding a packet from an incorrect source, thereby further saving a network bandwidth resource and ensuring reliable communication.

In a possible embodiment, the first multicast root node determines, based on a VRRP status of the first multicast root node being a master state, that the first multicast root node is the master root node. In the method, the first multicast root node is determined as the master root node by determining the VRRP status.

In a possible embodiment, before the second multicast root node discards the second multicast packet, the second multicast root node determines that an interface for receiving the second multicast packet is the same as an inbound interface corresponding to a second forwarding entry, where the second forwarding entry is a forwarding entry corresponding to an address in the second multicast packet.

In a possible embodiment, the second multicast root node determines, based on a VRRP status of the second multicast root node being a backup state, that the second multicast root node is the backup root node.

In a possible embodiment, when an interface of the first multicast root node receives the first multicast packet, the first multicast root node determines, based on determining that the interface for receiving the first multicast packet is the same as an inbound interface corresponding to a third forwarding entry and based on a VRRP status of the first multicast root node being a master state, that the first multicast root node is the master root node, where the third forwarding entry is a forwarding entry corresponding to an address in the first multicast packet. A check is performed at the interface of the multicast root node, and the VRRP status is determined, to determine to send a received multicast data stream, thereby avoiding resource waste caused by further processing of the multicast data stream by the network device.

In a possible embodiment, when an interface of the second multicast root node receives the second multicast packet, the second multicast root node determines, based on determining that the interface for receiving the second multicast packet is the same as an inbound interface corresponding to a fourth forwarding entry and based on a VRRP status of the second multicast root node being a backup state, that the second multicast root node is the backup root node, where the fourth forwarding entry is a forwarding entry corresponding to an address in the second multicast packet. A check is performed at the interface of the multicast root node, and the VRRP status is determined, to determine to discard a received multicast data stream, thereby avoiding resource waste caused by further processing of the multicast data stream by the network device.

In a possible embodiment, the method further includes: The second multicast root node updates the status to the master state based on a failure of the first multicast root node or a failure of a link between the first multicast root node and the specified multicast source, and sends a received third multicast packet to a second node, where the third multicast packet and the second multicast packet belong to a same multicast stream.

According to the solution, when the first multicast root node fails or the link between the first multicast root node and the specified multicast source fails, the status of the second multicast root node is switched from the backup state to the master state, and the second multicast root node sends the multicast data stream in place of the first multicast root node without external awareness, to ensure normal transmission of the multicast data stream.

In a possible embodiment, when the first multicast root node succeeds in a reverse path forwarding RPF check, it is determined that the first multicast root node is the master root node. The RPF check is performed at the interface of the multicast root node, and the VRRP status is determined, to determine to discard a received multicast data stream, thereby avoiding resource waste caused by further processing of the multicast data stream by the network device.

In a possible embodiment, when the second multicast root node succeeds in a reverse path forwarding RPF check, it is determined that the second multicast root node is the backup root node. The RPF check is performed at the interface of the multicast root node, and the VRRP status is determined, to determine to discard a received multicast data stream, thereby avoiding resource waste caused by further processing of the multicast data stream by the network device.

In a possible embodiment, that the first multicast root node sends the first multicast packet to a first node includes: The first multicast root node processes the first multicast packet into a bit index explicit replication BIER packet. The first multicast root node is a first bit-forwarding ingress router BFIR, and the second multicast root node is a second BFIR. The first multicast root node sends the BIER packet to the first node.

In a possible embodiment, that the first multicast root node sends the first multicast packet to a first node includes: The first multicast root node processes the first multicast packet into a multiprotocol label switching MPLS multicast packet. A multiprotocol label switching MPLS point-to-multipoint P2MP tunnel is established between the first multicast root node and the first node, and an MPLS P2MP tunnel is established between the second multicast root node and a third node.

According to a second aspect, this application provides a multicast packet sending method. The method includes: A first multicast root node receives a first multicast packet from a specified multicast source, where the first multicast root node and a second multicast root node belong to a same virtual router redundancy protocol VRRP group. The first multicast root node sends the first multicast packet to a first node based on a fact that the first multicast root node is a master root node.

In a possible embodiment, an address of the first multicast root node is different from an address of the second multicast root node.

In a possible embodiment, before the first multicast root node sends the first multicast packet to the first node, the first multicast root node determines that an interface for receiving the first multicast packet is the same as an inbound interface corresponding to a first forwarding entry. The first forwarding entry is a forwarding entry corresponding to an address in the first multicast packet.

In a possible embodiment, the first multicast root node determines, based on a master state of the first multicast root node, that the first multicast root node is the master root node.

In a possible embodiment, when an interface of the first multicast root node receives the first multicast packet, the first multicast root node determines, based on determining that the interface for receiving the first multicast packet is the same as an inbound interface corresponding to a second forwarding entry and based on a master state of the first multicast root node, that the first multicast root node is the master root node, where the second forwarding entry is a forwarding entry corresponding to an address in the first multicast packet.

In a possible embodiment, when the first multicast root node succeeds in a reverse path forwarding RPF check, it is determined that the first multicast root node is in a master state.

In a possible embodiment, that the first multicast root node sends the first multicast packet to a first node includes: The first multicast root node processes the first multicast packet into a BIER packet. The first multicast root node is a first bit-forwarding ingress router BFIR. The first multicast root node sends the BIER packet to the first node.

In a possible embodiment, that the first multicast root node sends the first multicast packet to a first node includes: The first multicast root node processes the first multicast packet into an MPLS packet. An MPLS P2MP tunnel is established between the first multicast root node and the first node. The first multicast root node sends the MPLS packet to the first node.

According to a third aspect, this application provides an apparatus, configured to perform the method in any one of the second aspect or the possible embodiments of the second aspect. Specifically, the apparatus includes a unit configured to perform the method in any one of the second aspect or the possible embodiments of the second aspect.

According to a fourth aspect, this application provides a multicast packet sending system. The system includes a first multicast root node and a second multicast root node that belong to a same virtual router redundancy protocol VRRP group.

The first multicast root node is configured to receive a first multicast packet from a specified multicast source, and send the first multicast packet to a first node based on a fact that the first multicast root node is a master root node.

The second multicast root node is configured to receive a second multicast packet from the specified multicast source, and discard the second multicast packet based on a fact that the second multicast root node is a backup root node, where the first multicast packet and the second multicast packet include same multicast data.

In a possible embodiment, an address of the first multicast root node is different from an address of the second multicast root node.

In a possible embodiment, the first multicast root node is further configured to: before sending the first multicast packet to the first node, determine, by the first multicast root node, that an interface for receiving the first multicast packet is the same as an inbound interface corresponding to a first forwarding entry, where the first forwarding entry is a forwarding entry corresponding to an address in the first multicast packet.

In a possible embodiment, the first multicast root node is specifically configured to determine, by the first multicast root node based on a VRRP status of the first multicast root node being a master state, that the first multicast root node is the master root node.

In a possible embodiment, the second multicast root node is configured to: before discarding the second multicast packet, determine that an interface for receiving the second multicast packet is the same as an inbound interface corresponding to a second forwarding entry, where the second forwarding entry is a forwarding entry corresponding to an address in the second multicast packet.

In a possible embodiment, the second multicast root node is specifically configured to determine, by the second multicast root node based on a VRRP status of the second multicast root node being a backup state, that the second multicast root node is the backup root node.

In a possible embodiment, the first multicast root node is specifically configured to: when an interface of the first multicast root node receives the first multicast packet, determine, by the first multicast root node based on determining that the interface for receiving the first multicast packet is the same as an inbound interface corresponding to a third forwarding entry and based on a VRRP status of the first multicast root node being a master state, that the first multicast root node is the master root node, where the third forwarding entry is a forwarding entry corresponding to an address in the first multicast packet.

In a possible embodiment, the second multicast root node is specifically configured to: when an interface of the second multicast root node receives the second multicast packet, determine, by the second multicast root node based on determining that the interface for receiving the second multicast packet is the same as an inbound interface corresponding to a fourth forwarding entry and based on a VRRP status of the second multicast root node being a backup state, that the second multicast root node is the backup root node, where the fourth forwarding entry is a forwarding entry corresponding to an address in the second multicast packet.

In a possible embodiment, the second multicast root node is further configured to send a received third multicast packet to a second node based on an update of the second multicast root node to the master state and based on a failure of the first multicast root node or a failure of a link between the first multicast root node and the specified multicast source, where the third multicast packet and the second multicast packet belong to a same multicast stream.

In a possible embodiment, for the first multicast root node, being based on a fact that the first multicast root node is a master root node includes: when the first multicast root node succeeds in an RPF check, determining that the first multicast root node is the master root node.

In a possible embodiment, for the second multicast root node, being based on a fact that the second multicast root node is a backup root node includes: when the second multicast root node succeeds in an RPF check, determining that the second multicast root node is the backup root node.

In a possible embodiment, that the first multicast root node sends the first multicast packet to a first node includes: The first multicast root node processes the first multicast packet into a BIER packet. The first multicast root node is a first bit-forwarding ingress router BFIR, and the second multicast root node is a second BFIR. The first multicast root node sends the BIER packet to the first node.

In a possible embodiment, that the first multicast root node sends the first multicast packet to a first node includes: The first multicast root node processes the first multicast packet into an MPLS multicast packet. An MPLS P2MP tunnel is established between the first multicast root node and the first node, and an MPLS P2MP tunnel is established between the second multicast root node and the first node.

According to a fifth aspect, this application provides a network device. The network device includes a processor, a communication interface, and a memory. The memory may be configured to store program code, and the processor is configured to invoke the program code in the memory to perform the method performed by the first multicast root node or the second multicast root node in any one of the first aspect or the possible embodiments of the first aspect, or perform the method in any one of the second aspect or the possible embodiments of the second aspect. For details, refer to the detailed descriptions in the method example. Details are not described herein.

According to a sixth aspect, this application provides a computer-readable medium, including instructions or a program. When the instructions or the program is executed on a computer, the computer is enabled to perform the method performed by the first multicast root node or the second multicast root node in any one of the first aspect or the possible embodiments of the first aspect, or perform the method in any one of the second aspect or the possible embodiments of the second aspect.

According to a seventh aspect, this application provides a computer program product. When the program is run on a computer, the computer is enabled to perform the method performed by the first multicast root node or the second multicast root node in any one of the first aspect or the possible embodiments of the first aspect, or perform the method in any one of the second aspect or the possible embodiments of the second aspect.

DESCRIPTION OF EMBODIMENTS

With reference to accompanying drawings, the following describes a multicast packet sending method and apparatus provided in a conventional technology and a multicast packet sending method and apparatus provided in embodiments of this application.

Figure 1:
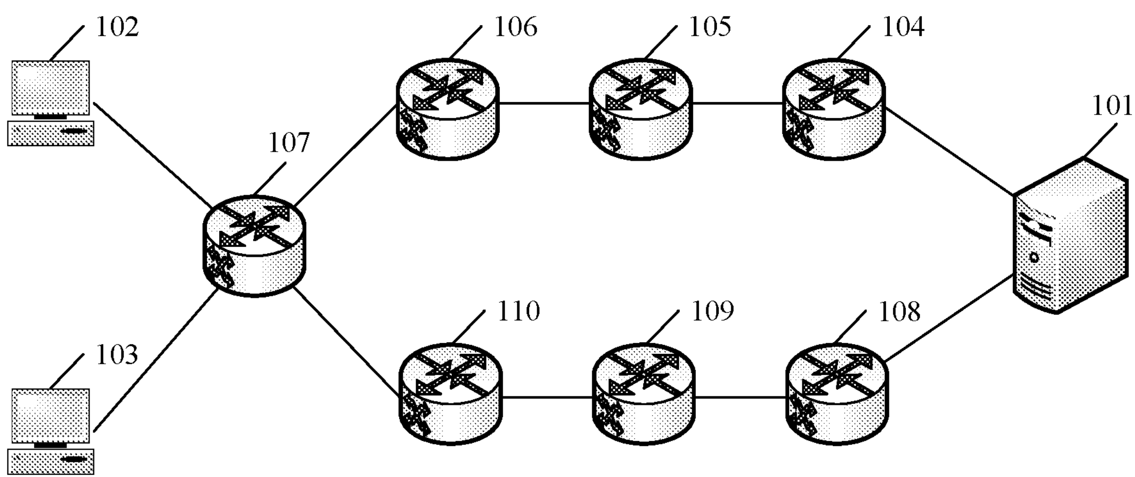
FIG. 1 is a schematic diagram of a network architecture of a conventional multicast network according to an embodiment of this application.

FIG. 1 is a schematic diagram of a network architecture of a conventional multicast network. In FIG. 1, a system 100 includes a server 101, a terminal device 102, a terminal device 103, a network device 104, a network device 105, a network device 106, a network device 107, a network device 108, a network device 109, and a network device 110. The server 101 is separately connected to the network device 104 and the network device 108. The network device 104 is connected to the network device 105, and the network device 105 is connected to the network device 106. The network device 108 is connected to the network device 109, and the network device 109 is connected to the network device 110. The network device 107 is separately connected to the network device 106 and the network device 110. The terminal device 102 and the terminal device 103 are connected to the network device 107. In this embodiment of this application, the network device 104 to the network device 110 may be forwarding devices such as routers or switches.

The server 101 serves as a multicast source, and sends a multicast data stream such as an audio stream, a video stream, or an image stream. The server 101 sends the multicast data stream to another device in the multicast network via the network device 104 or the network device 108, so that a target device of the multicast data stream receives the multicast data stream. In this case, the terminal device 102 and the terminal device 103 are referred to as target devices or receiving devices of the multicast data stream, the network device 104 and the network device 108 that are directly connected to the multicast source are referred to as root nodes, and the network device 107 directly connected to the terminal device 102 and the terminal device 103 may be referred to as a destination node or a leaf node. Either of the network device 104 and the network device 108 may serve as a master root node, and the other is a backup root node.

When there is only one multicast root node in the multicast network or only one multicast root node works, for example, the network device 108 does not exist or does not work, the server 101 may send a multicast data stream to another device in the multicast network via the network device 104. When target devices of the multicast data stream sent by the server 101 are the terminal device 102 and the terminal device 103, the network device 104 may forward the multicast data stream to the network device 105, and then the network device 105 forwards the multicast data stream to the network device 107 via the network device 106. Finally, the network device 107 replicates the multicast data stream and forwards the multicast data stream to the terminal device 102 and the terminal device 103. In this embodiment, the multicast data stream successively passes through the network device 104, the network device 105, the network device 106, and the network device 107. In some embodiments, when the multicast network further has another network device, the multicast data stream may be further sent by the server 101 to the terminal device 102 and the terminal device 103 through another forwarding path. Details are not described in this application.

A multicast data stream received by another network device in the multicast network is obtained and forwarded by a multicast root node from the multicast source. Therefore, when the multicast source is connected to only one multicast root node, once the multicast root node fails, transmission of the multicast data stream is affected. For example, it is assumed that there is only one network device 104 connected to the server 101 in the system 100. Once the network device 104 fails, a multicast data stream received by the network device 105, the network device 106, and the network device 107 is affected. As a result, the terminal device 102 and the terminal device 103 cannot receive the multicast data stream sent by the server 101.

To resolve this problem, in a conventional technology, two multicast root nodes connected to the multicast source are deployed for the multicast source, where one of the two multicast root nodes serves as a master root node, and the other serves as a backup root node. The destination node may simultaneously receive two same multicast data streams sent through a master path and a backup path, and choose to forward only one multicast data stream to a target device. For example, after receiving two multicast data streams from the master path and the backup path, the network device 107 forwards only the multicast data stream from the master path to the terminal device 102 and the terminal device 103, and discards the multicast data stream from the backup path. When the network device 104 fails or a link between the server 101 and the network device 104 is interrupted, the network device 107 forwards the multicast data stream from the backup path, to ensure that the multicast data stream received by the terminal device 102 and the terminal device 103 is not interrupted for a long time due to the failure of the network device 104.

However, in this technology, the master root node and the backup root node need to respectively send same multicast data streams to the destination node through the master path and the backup path. As a result, in the multicast bearer network, there are two multicast data streams with same content, which occupy network resources and cause waste of a network bandwidth resource. In an environment in which network bandwidth resources are scarce, this method may affect normal transmission of another multicast data stream.

To overcome the problem of the conventional technology, embodiments of this application provide a multicast packet sending method, apparatus, and system, to reduce waste of a network bandwidth resource on the premise of ensuring that a multicast data stream received by a target device is not affected by a failure of a master root node.

Figure 2:
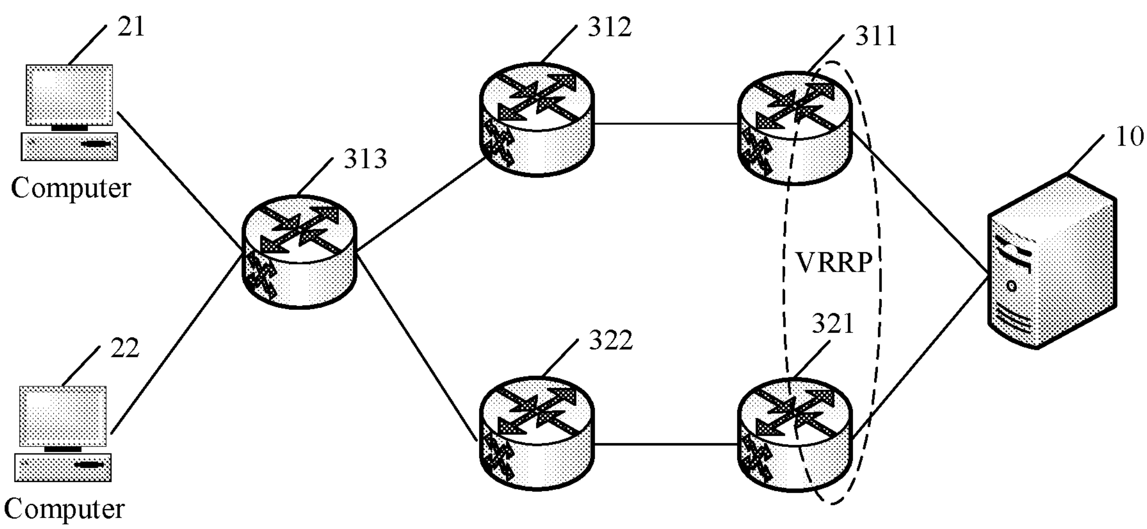
FIG. 2 is a schematic diagram of a network architecture of a multicast network according to an embodiment of this application.

The multicast packet sending method provided in embodiments of this application may be applied to a schematic diagram of a network architecture shown in FIG. 2. The following describes the multicast packet sending method with reference to FIG. 2. Details are not described herein.

FIG. 2 includes a server 10, a terminal device 21, a terminal device 22, a network device 311, a network device 312, a network device 313, a network device 321, and a network device 322. The server 10 may be connected to the network device 311 and the network device 321. The network device 311 may be connected to the network device 312, and the network device 321 may be connected to the network device 322. The network device 313 may be separately connected to the network device 312 and the network device 322. The terminal device 21 and the terminal device 22 may be connected to the network device 313. In this embodiment of this application, the network device 311, the network device 312, the network device 313, the network device 321, and the network device 322 may be forwarding devices such as routers or switches.

The terminal device 21 and the terminal device 22 are also referred to as a receiving device, or a device that provides voice and/or data connectivity, such as user equipment (UE), a mobile station (MS), or a mobile terminal (MT), or a chip disposed in the device, for example, a handheld device with a wireless connection function or a vehicle-mounted device. Currently, some examples of the terminal devices are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

In this embodiment of this application, the server 10 serves as a multicast source to generate and send a multicast data stream. Target devices of the multicast data stream may be the terminal device 21 and the terminal device 22. The network device 311 and the network device 321 that are connected to the server 10 are referred to as multicast root nodes. The virtual router redundancy protocol (VRRP) is deployed on interfaces that are of the network device 311 and the network device 321 and that are connected to the server 10, so that the network device 311 and the network device 321 belong to a same VRRP group. One of the network device 311 and the network device 321 is a master root node, and the other is a backup root node. The network device 311 and the network device 321 receive the multicast data stream from the server 10. In the VRRP, a plurality of routing devices are combined to form a virtual routing device, and an IP address of the virtual routing device is used as a default gateway of a user to communicate with an external network. When a gateway device fails, a VRRP mechanism can elect a new network device to undertake transmission of a multicast packet, thereby ensuring reliable communication of a network.

Figure 3:
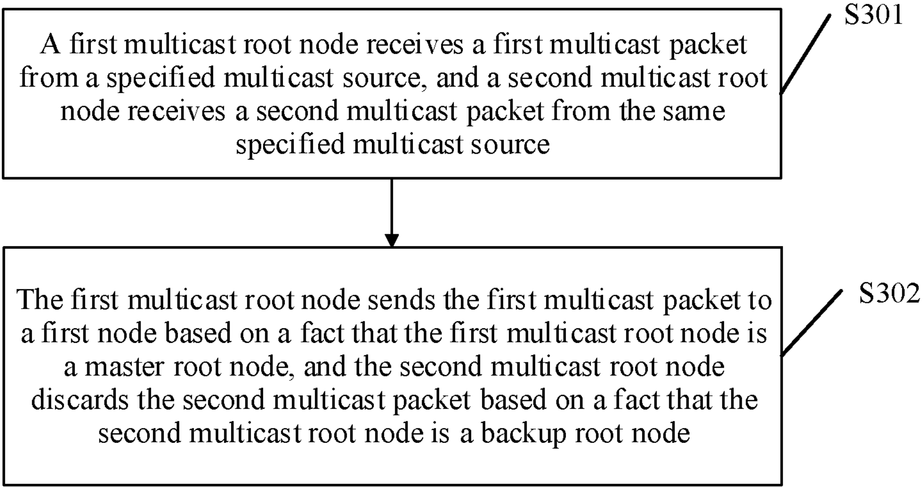
FIG. 3 is a schematic flowchart of a multicast packet sending method according to an embodiment of this application.

FIG. 3 is a schematic flowchart of a multicast packet sending method according to an embodiment of this application. The method includes the following operations.

S301: A first multicast root node receives a first multicast packet from a specified multicast source, and a second multicast root node receives a second multicast packet from the same specified multicast source.

In this embodiment of this application, the first multicast root node and the second multicast root node belong to a same VRRP group. A network device in the VRRP group is in a master state or a backup state. For example, the first multicast root node is in the master state and is a master root node, and the second multicast root node is in the backup state and is a backup root node. The VRRP group includes a virtual Internet Protocol (IP) address and a virtual media access control (MAC) address. In an example, an address of the first multicast root node is different from an address of the second multicast root node. For example, an IP address of the first multicast root node is different from an IP address of the second multicast root node.

In an example, the VRRP group may send a multicast packet through master/backup switchover, and one VRRP group may include more than two network devices. In a master/backup switchover mode scenario, the VRRP group includes one master root node and one or more backup root nodes. After the master root node fails, a plurality of backup root nodes contend to become a new master root node. The first multicast root node receives the first multicast packet from the specified multicast source, and the second multicast root node receives the second multicast packet from the same specified multicast source, where the first multicast packet and the second multicast packet include same multicast data. Alternatively, it may be understood that payload parts of the first multicast packet and the second multicast packet are the same. For example, the first multicast packet and the second multicast packet carry same multicast data such as audio data, video data, or image data. The specified multicast source is a device that is specified in a network and that can send a multicast packet, for example, the server 10 in FIG. 2.

The first multicast root node and the second multicast root node provide services for a multicast data stream bound to the specified multicast source. For example, the network device 311 and the network device 321 provide forwarding services only for a multicast packet from the server 10. Relative to “arbitrary”, “specified” means specific. As expressed in the first multicast packet, a multicast source address of the first multicast packet is a specified multicast source address.

For example, with reference to FIG. 2, the VRRP is run on an interface GE1/0/0 of the network device 311 and GE1/0/0 of the network device 321, and the network device 311 and the network device 321 form a VRRP group. A virtual IP address of the VRRP group is 10.1.1.10/24, and a virtual MAC address of the VRRP group is 00-00-5E-00-01-{VRID} (VRRP for IPV4). The network device 311 in the VRRP group has a high priority and serves as a master root node. Another network device in the VRRP group serves as a backup root node and is in a listening state. Once the master root node cannot implement normal forwarding of a multicast packet, the backup root node takes over a task of the original master root node to forward the multicast packet.

S302: The first multicast root node sends the first multicast packet to a first node based on a fact that the first multicast root node is a master root node, and the second multicast root node discards the second multicast packet based on a fact that the second multicast root node is a backup root node.

The first multicast root node and the second multicast root node send or discard the multicast packet based on statuses of the first multicast root node and the second multicast root node in the VRRP group. When the first multicast root node determines, based on a VRRP status of the first multicast root node being the master state, that the first multicast root node is the master root node, the first multicast root node sends the first multicast packet to the first node. When the second multicast root node determines, based on a VRRP status of the second multicast root node being the backup state, that the second multicast root node is the backup root node, the second multicast root node discards the second multicast packet.

In actual application, states of the master root node and the backup root node may be indicated by a VRRP status identifier. For example, a network device whose status identifier is Master is the master root node, and a network device whose status identifier is Backup is the backup root node. Therefore, the first multicast root node determines, based on the status of the first multicast root node being Master, that the first multicast root node is the master root node. The second multicast root node determines, based on the status being Backup, that the second multicast root node is the backup root node. In this application, another identifier may alternatively be used by the network device to determine whether the network device is the master root node or the backup root node. Only one multicast data stream is transmitted in the multicast network in this embodiment of this application, and a network bandwidth resource is saved, compared with a solution of transmitting two same multicast data streams in a conventional technology.

In an example, before the first multicast root node sends the first multicast packet to the first node, the first multicast root node determines that an interface for receiving the first multicast packet is the same as an inbound interface corresponding to a first forwarding entry. The first forwarding entry is a forwarding entry corresponding to an address in the first multicast packet. For example, the multicast packet address is a multicast source address or a multicast group address, or a multicast source address and a multicast group address. Before the second multicast root node discards the first multicast packet, the second multicast root node determines that an interface for receiving the first multicast packet is the same as an inbound interface corresponding to a second forwarding entry, where the second forwarding entry is a forwarding entry corresponding to an address in the first multicast packet. By checking the first multicast packet, the first multicast root node or the second multicast root node may be prevented from forwarding a packet from an incorrect source, thereby further saving a network bandwidth resource.

In an embodiment, the interface determining manner is correlated with determining of a VRRP status of a network device. For example, when an interface of the first multicast root node receives the first multicast packet, the first multicast root node determines, based on determining that the interface for receiving the first multicast packet is the same as an inbound interface corresponding to a third forwarding entry and based on the VRRP status of the first multicast root node being the master state, that the first multicast root node is the master root node, where the third forwarding entry is a forwarding entry corresponding to an address in the first multicast packet. When an interface of the second multicast root node receives the second multicast packet, the second multicast root node determines, based on determining that the interface for receiving the second multicast packet is the same as an inbound interface corresponding to a fourth forwarding entry and based on the VRRP status of the second multicast root node being the backup state, that the second multicast root node is the backup root node, where the fourth forwarding entry is a forwarding entry corresponding to an address in the second multicast packet.

In an example, the second multicast root node sends a received third multicast packet to a second node based on an update of the VRRP status of the second multicast root node from the backup state to the master state and based on a failure of the first multicast root node or a failure of a link between the first multicast root node and the specified multicast source, where the third multicast packet and the second multicast packet belong to a same multicast stream.

In an example, when the interface of the first multicast root node receives the first multicast packet, a reverse path forwarding (RPF) check is performed on the first multicast packet. A check rule is to search a unicast routing table, a Multicast Border Gateway Protocol (MBGP) routing table, a Multicast Interior Gateway Protocol (MIGP) routing table, or a multicast static routing table based on the address carried in the multicast packet, to select an optimal routing entry from these routing tables as an RPF routing entry. If an interface at which the packet actually arrives is the same as an interface in the RPF routing entry, the RPF check succeeds, and a multicast routing entry is created. Otherwise, the RPF check fails, and the multicast packet is discarded.

In an example, the RPF check is correlated or associated with determining of a VRRP status. Further, the RPF check is correlated with or bound to determining of a VRRP status of a network device. For example, an AND logical operation is set for the RPF check and the determining of the VRRP status of the network device. The RPF check may be first performed, or the determining of the VRRP status may be first performed. When the network device succeeds in the RPF check and determines that the status of the network device is Master, the network device receives a multicast packet. When the network device succeeds in the RPF check and determines that the status of the network device is Backup, the network device discards the multicast packet. For example, when succeeding in the RPF check, the first multicast root node determines, based on determining that the status of the first multicast root node in the VRRP is Master, that the first multicast root node is the master root node. When succeeding in the RPF check, the second multicast root node determines, based on determining that the status of the second multicast root node in the VRRP is Backup, that the second multicast root node is the backup root node, and does not replicate or send the multicast packet to a downstream leaf node. When an interface of the network device receives a packet, an RPF check is performed on the multicast packet, and the VRRP status is determined, to determine to send or discard a received multicast data stream, thereby avoiding resource waste caused by further processing of the multicast data stream by the network device.

In some other embodiments, the first multicast root node or the second multicast root node may first determine a role played by the first multicast root node or the second multicast root node in the VRRP group, and then check the first multicast packet. For example, on the premise that the first multicast root node determines that the first multicast root node is the master root node, the RPF check is performed on the first multicast root node, and if a check result is a success, the first multicast packet is sent. If the second multicast root node determines that the second multicast root node is the backup root node, the second multicast root node may directly discard the first multicast packet without performing the RPF check, thereby saving a network resource of the second multicast root node.

For example, FIG. 2 is used as an example. The system shown in FIG. 2 has two multicast root nodes: the network device 311 and the network device 321, which separately receive a first multicast packet from the server 10. It is assumed that the network device 311 is the first multicast root node, and a role played by the network device 311 in the VRRP group is the master root node; and the network device 321 is the second multicast root node, and a role played by the network device 321 in the VRRP group is the backup root node. In this case, after determining that the role of the network device 321 is the backup root node, the network device 321 discards the received first multicast packet, that is, does not send the first multicast packet to the network device 322. After determining that the role of the network device 311 is the master root node, the network device 311 sends the first multicast packet to the network device 312 directly connected to the network device 311, so that the network device 312 sends the first multicast packet to the network device 313 serving as a destination node. Then, the network device 313 sends the first multicast packet to the terminal device 21 and/or the terminal device 22. In this way, the terminal device 21 and/or the terminal device 22 may receive the first multicast packet sent by the server 10. Because the network device 321 does not send the first multicast packet to the network device 313, there is only one path in the system to forward the first multicast packet, thereby saving a network bandwidth resource of a network device on a backup path.

In an example, the method further includes: The second multicast root node updates the status to the master state based on a failure of the first multicast root node or a failure of a link between the first multicast root node and the specified multicast source, and sends a received third multicast packet to a second node, where the third multicast packet and the second multicast packet belong to a same multicast stream. According to the solution, when the first multicast root node fails or the link between the first multicast root node and the specified multicast source fails, the status of the second multicast root node is switched from the backup state to the master state, and the second multicast root node sends the multicast data stream in place of the first multicast root node without external awareness, to ensure normal transmission of the multicast data stream.

In this embodiment of this application, the multicast network may transmit a multicast packet by using a bit index explicit replication (BIER) technology or a multiprotocol label switching (MPLS) technology. Therefore, when sending the first multicast packet to the destination node, the first multicast root node may process the first multicast packet into a third multicast packet in a corresponding format, and then send the third multicast packet to the destination node.

When the BIER technology is used, the first multicast root node is a first bit-forwarding ingress router (BFIR), and the second multicast root node may be a second BFIR. The first multicast root node encapsulates the first multicast packet into a third multicast packet in a BIER multicast packet format, and sends the third multicast packet to the first node. For specific packet processing and sending processes, refer to descriptions in the following embodiments.

When the MPLS technology is used, an MPLS point-to-multipoint (P2MP) tunnel is established between the first multicast root node and the destination node. Similarly, an MPLS P2MP tunnel is established between the second multicast root node and the destination node. The first multicast root node encapsulates the first multicast packet into a third multicast packet in an MPLS multicast packet format, and sends the third multicast packet to the destination node through the MPLS P2MP tunnel. For specific tunnel establishment and packet processing and sending processes, refer to descriptions in the following embodiments.

The foregoing describes the multicast packet sending method when the first multicast root node normally works and the link between the first multicast root node and the multicast source is normal. The following describes a multicast packet sending method when the first multicast root node fails or the link between the first multicast root node and the multicast source fails. In this embodiment of this application, when the first multicast root node fails or the link between the first multicast root node and the multicast source fails, the second multicast root node may change the role played by the second multicast root node in the VRRP group from the backup root node to the master root node, and after receiving the second multicast packet sent by the multicast source, send the second multicast data stream to the destination node based on switchover of the role of the second multicast root node to the master root node. The second multicast packet and the first multicast packet belong to a same multicast stream. In this way, when the first multicast root node cannot send a multicast data stream to the destination node, the second multicast root node sends the multicast data stream in place of the first multicast root node, to ensure normal transmission of the multicast data stream.

In this embodiment of this application, the second multicast root node may detect a working status of the first multicast root node by using a bidirectional forwarding detection (BFD) technology. If the second multicast root node receives a heartbeat packet from the first multicast root node through a link between the first multicast root node and the second multicast root node, it indicates that the first multicast root node does not fail; or otherwise, it indicates that the first multicast root node fails. The heartbeat packet is a periodically sent detection packet. In some embodiments, the second multicast root node may alternatively determine a failure of the first multicast root node in another manner. This is not further limited in this embodiment of this application.

Still refer to FIG. 2. When both the network device 321 and the network device 311 normally work, the network device 311 and the network device 321 may receive a first multicast packet from the server 10. The network device 311 may determine that the role played by the network device 311 in the VRRP group is the master root node, and send the first multicast packet to the network device 313 serving as the destination node. The network device 321 may determine that the role played by the network device 321 in the VRRP group is the backup root node, and discard the first multicast packet.

When the network device 311 fails or a link between the network device 311 and the server 10 fails, a VRRP status of the network device 321 is switched from the backup state to the master state, and the network device 321 receives a second multicast packet from the server 10 and sends the second multicast packet to the network device 313, thereby ensuring that the terminal device 21 and/or the terminal device 22 may receive the multicast data stream from the server 10.

In this embodiment of this application, when multicast root node sets of a plurality of multicast sources are completely the same or partially the same, a plurality of different VRRP groups may be established, and each VRRP group corresponds to one multicast source. Because VRRP groups corresponding to different multicast sources are independent of each other, roles played by a same multicast root node in different VRRP groups are also independent of each other, that is, roles played by a same multicast root node in different VRRP groups may be the same or different.

Figure 4:
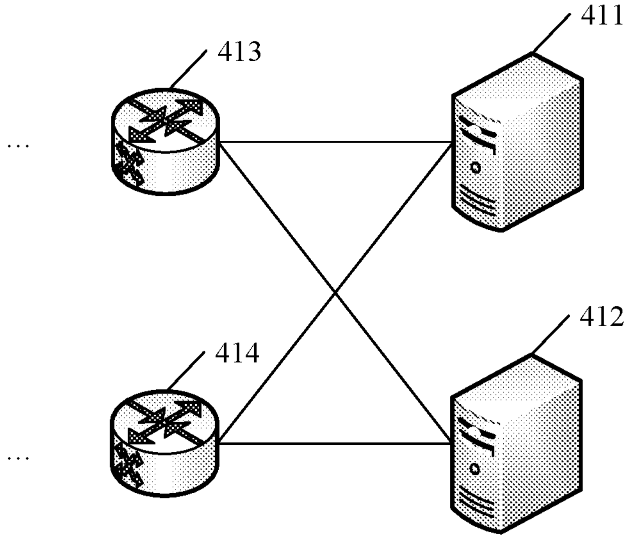
FIG. 4 is a schematic diagram of a network architecture according to an embodiment of this application.

FIG. 4 is a diagram of a network architecture according to an embodiment of this application. In this embodiment, a multicast network may include a server 411, a server 412, a network device 413, and a network device 414. In other embodiments, the multicast network may further include another network device or another device (not shown in the figure). In this embodiment, a multicast root node set of the server 411 includes the network device 413 and the network device 414, and a multicast root node set of the server 412 includes the network device 413 and the network device 414.

For packets from different multicast sources, the network device 413 and the network device 414 may form different VRRP groups. The network device 413 and the network device 414 may form a VRRP group A for a multicast data stream from the server 411, and form a VRRP group B for a multicast data stream from the server 412. In different VRRP groups, roles played by the network device 413 or the network device 414 are independent of each other, and may be the same or different. That a same network device plays different roles in different VRRP groups is used as an example. In the VRRP group A, the network device 413 may play a role of a master root node, and the network device 414 may play a role of a backup root node. However, in the VRRP group B, the network device 413 may play a role of a backup root node, and the network device 414 may play a role of a master root node. In this way, when the server 411 and the server 412 each send a multicast data stream to the outside and the network devices normally work, there is only one multicast data stream in each of the network device 413 and the network device 414. That is, the network device 413 and the network device 414 each undertake a task of sending one multicast data stream, so that load sharing is implemented between the root nodes.

According to the foregoing descriptions, the multicast packet sending method provided in embodiments of this application may be applied to a BIER scenario. The following describes in detail two application scenarios: a single multicast domain and crossing multicast domains.

Figure 5:
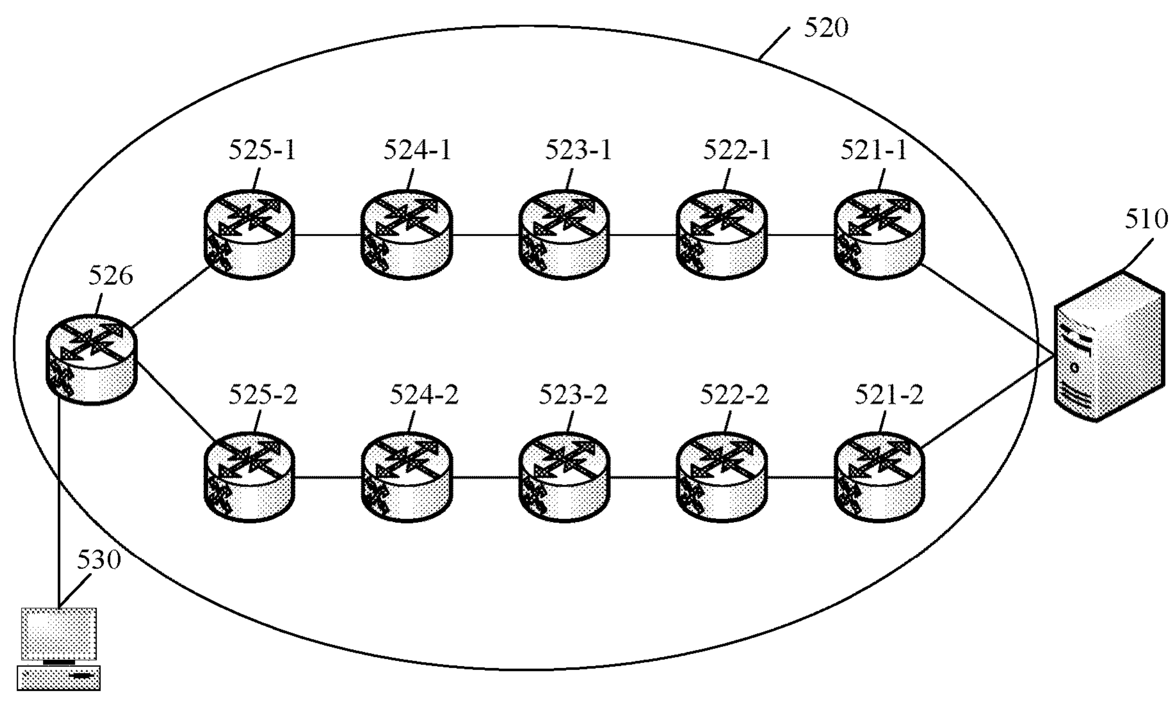
FIG. 5 is a schematic diagram of a network architecture of a multicast network according to an embodiment of this application.

First, a case in which a BIER technology is used to transmit a packet in a single multicast domain is described. FIG. 5 is a schematic diagram of a network architecture of a multicast network according to an embodiment of this application. In this embodiment, the multicast bearer network may include a server 510, a network device 521-1, a network device 521-2, a network device 522-1, a network device 522-2, a network device 523-1, a network device 523-2, a network device 524-1, a network device 524-2, a network device 525-1, a network device 525-2, a network device 526, and a terminal device 530. The network device 521-1, the network device 521-2, the network device 522-1, the network device 522-2, the network device 523-1, the network device 523-2, the network device 524-1, the network device 524-2, the network device 525-1, the network device 525-2, and the network device 526 may be located in a same multicast domain 520. The multicast domain 520 may be an Interior Gateway Protocol (IGP) domain. In this embodiment of this application, the server 510 may serve as a multicast source, and send a multicast data stream to the terminal device 530 via a plurality of network devices in the multicast domain 520. In this embodiment, different network devices may be different physical devices, which are described in detail below.

The network device 521-1 and the network device 521-2 serve as provider edge (PE) devices of multicast root nodes, are directly connected to the server 510, and receive the multicast data stream from the server 510. The network device 522-1 and the network device 522-2 are a collective term of provider (P) devices in the multicast domain 520. The network device 523-1 and the network device 523-2 may be PE devices in the multicast domain 520. The network device 524-1 and the network device 524-2 may be regional core (RC) devices in the multicast domain 520. The network device 525-1 and the network device 525-2 may be aggregate (AGG) devices in the multicast domain 520. The network device 526 may be an access (ACC) device in the multicast domain 520. In this embodiment, the multicast data stream from the server 510 may be transmitted to the network device 526 in an order of the network device 521-1, the network device 522-1, the network device 523-1, the network device 524-1, and the network device 525-1; or may be transmitted to the network device 526 in an order of the network device 521-2, the network device 522-2, the network device 523-2, the network device 524-2, and the network device 525-2.

In this embodiment, the multicast domain 520 is a BIER network, both the network device 521-1 and the network device 521-2 are BFIRs, and the network device 526 is a bit-forwarding egress router (BFER). In an example, a provider multicast service interface (PMSI) tunnel is established between the network device 521-1 and the network device 526, and a PMSI tunnel is also established between the network device 521-2 and the network device 526. In this embodiment, the network device 521-1 and the network device 521-2 may form a VRRP group. The following provides a description by using an example in which the network device 521-1 is a first multicast root node whose role is a master root node, and the network device 521-2 is a second multicast root node whose role is a backup root node.

The server 510 sends a first multicast packet to the network device 521-1 and the network device 521-2 through a link. After receiving the first multicast packet, the network device 521-1 may determine a VRRP status of the network device 521-1; determine, based on the VRRP status of the network device 521-1 being a master state, that the network device 521-1 is the master root node; encapsulate the first multicast packet into a BIER packet; and then send the encapsulated BIER packet to the network device 522-1. After receiving the first multicast packet, the network device 521-2 determines that the role of the network device 521-2 is the backup root node, and discards the first multicast packet.

In addition, before determining that the VRRP status of the network device 521-1 is the master root node, the network device 521-1 may perform an RPF check, and check the VRRP status to determine whether the network device 521-1 is the master root node. If the network device 521-1 is the master root node, the network device 521-1 forwards the first multicast packet. Similarly, before determining that the VRRP status of the network device 521-2 is the backup root node, the network device 521-2 may first perform an RPF check; and if the check succeeds, further determine whether the network device 512-2 is the backup root node. If the network device 521-2 is the backup root node, the network device 521-2 discards the first multicast packet.

Alternatively, the network device 521-1 determines that the VRRP status of the network device 521-1 is the master root node, and then performs an RPF check. If the check succeeds, the network device 521-1 forwards the first multicast packet. If the check fails, the network device 521-1 discards the first multicast packet. After determining that the VRRP status of the network device 521-2 is the backup root node, the network device 521-2 may directly discard the first multicast packet without performing an RPF check, to save a system resource of the network device 521-2.

The RPF check is associated with determining of a VRRP status. For example, an AND logical operation is set for the RPF check and the determining of the VRRP status of the network device. The RPF check may be first performed, or the determining of the VRRP status may be first performed. For example, when succeeding in the RPF check and determining that the status of the network device 521-1 in the VRRP is Master, the network device 521-1 determines that the network device 521-1 is the master root node. When succeeding in the RPF check and determining that the status of the network device 521-2 in the VRRP is Backup, the network device 521-2 determines that the network device 521-2 is the backup root node, and does not replicate or send the multicast packet to a downstream leaf node. When an interface of the network device receives a packet, an RPF check is performed on the multicast packet, and the VRRP status is determined, to determine to send or discard a received multicast data stream, thereby avoiding resource waste caused by further processing of the multicast data stream by the network device.

When the network device 521-1 serving as the master root node fails or a link between the network device 521-1 and the server 510 fails, the multicast data stream from the server 510 cannot be transmitted to the terminal device 530 through a transmission path the network device 521-1, the network device 522-1, the network device 523-1, the network device 524-1, and the network device 525-1. In this case, the network device 521-2 may switch the VRRP status of the network device 521-2 from the backup root node to the master root node. The network device 521-2 receives a second multicast packet from the server 510, and the network device 521-2 sends the second multicast packet to the network device 522-2 based on the role of the network device 521-2 being the master root node. Therefore, the second multicast packet reaches the terminal device 530 along a transmission path the network device 521-2, the network device 522-2, the network device 523-2, the network device 524-2, and the network device 525-2. This ensures that the terminal device 530 can receive a multicast data stream to which the first multicast packet and the second multicast packet belong, thereby ensuring network reliability.

Figure 6:
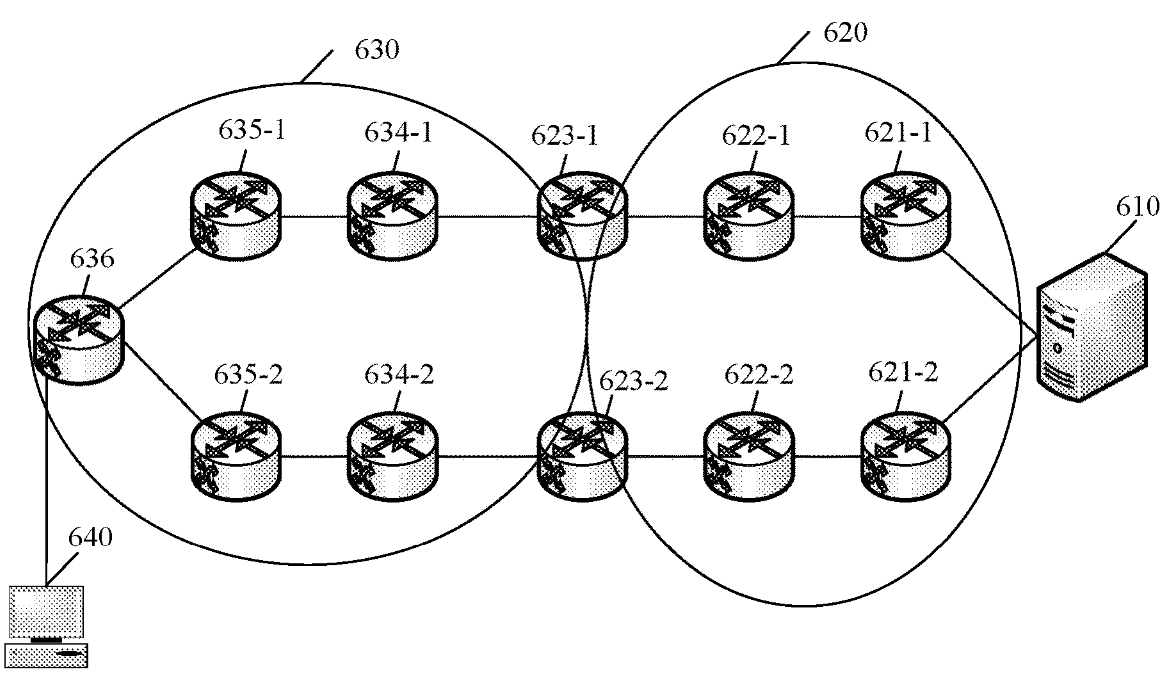
FIG. 6 is a schematic diagram of a network architecture of a multicast network according to an embodiment of this application.

The following describes an application scenario in which a packet is transmitted across multicast domains by using the BIER technology. FIG. 6 is a schematic diagram of a network architecture of a multicast network according to an embodiment of this application. In this embodiment, the multicast network includes a server 610, a terminal device 640, a network device 621-1, a network device 621-2, a network device 622-1, a network device 622-2, a network device 634-1, a network device 634-2, a network device 635-2, a network device 635-2, and a network device 636. The network device 621-1, the network device 621-2, the network device 622-1, and the network device 622-2 may be located in a multicast domain 620. The network device 634-1, the network device 634-2, the network device 635-1, the network device 635-2, and the network device 636 may be located in a multicast domain 630. The multicast domain 620 and the multicast domain 630 are different BIER domains. In this embodiment of this application, the server 610 serves as a specified multicast source, and transmits a multicast data stream to the terminal device 640 via a plurality of network devices in the multicast domain 620 and the multicast domain 630. To implement cross-domain transmission of the multicast data stream, a network device 623-1 and a network device 623-2 may be area border routers (ABR). The network device 623-1 and the network device 623-2 may belong to both the first BIER domain 620 and the second BIER domain 630.

Similar to the previous embodiment, in this embodiment, in the first multicast domain 620, the network device 621-1 and the network device 621-2 are BFIRs, and the network device 623-1 and the network device 623-2 are BFERs. In the second multicast domain 630, the network device 623-1 and the network device 623-2 are BFIRs, and the network device 636 is a BFER. A PMSI tunnel may be established between the network device 621-1 and the network device 623-1, a PMSI tunnel may also be established between the network device 621-2 and the network device 623-2, a PMSI tunnel may be established between the network device 623-1 and the network device 636, and a PMSI tunnel may be established between the network device 623-2 and the network device 636. This is equivalent to establishing a long cross-domain tunnel from the network device 621-1 to the network device 636 and a long cross-domain tunnel from the network device 621-2 to the network device 636.

In this embodiment, the network device 621-1 and the network device 621-2 form a VRRP group. The following provides a description by using an example in which the network device 621-1 is a first multicast root node whose role is a master root node, and the network device 621-2 is a second multicast root node whose role is a backup root node.

The server 610 sends a first multicast packet and a second multicast packet to the network device 621-1 and the network device 621-2 through a link. After receiving the first multicast packet, the network device 621-1 may determine that a VRRP status of the network device 621-1 is a master state, and send the first multicast packet to the network device 622-1, so that the network device 636 serving as a destination node sends the first multicast packet to the terminal device 640 serving as a target device. After receiving the second multicast packet, the network device 621-2 may determine that a VRRP status of the network device 621-2 is a backup state, and discard the second multicast packet.

In addition, before determining that the role of the network device 621-1 is the master root node, the network device 621-1 may first perform an RPF check; and if the check succeeds, further determine whether the network device 621-1 is the master root node. If the network device 621-1 is the master root node, the network device 621-1 forwards the first multicast packet. Similarly, before determining that the role of the network device 621-2 is the backup root node, the network device 621-2 may first perform an RPF check; and if the check succeeds, further determine whether the network device 621-2 is the backup root node. If the network device 621-2 is the backup root node, the network device 621-2 discards the first multicast packet.

Alternatively, the network device 621-1 first determines that the role of the network device 621-1 is the master root node, and then performs an RPF check. If the check succeeds, the network device 621-1 forwards the first multicast packet. If the check fails, the network device 621-1 discards the first multicast packet. After determining that the role of the network device 621-2 is the backup root node, the network device 621-2 may directly discard the first multicast packet without performing an RPF check, to save a system resource of the network device 621-2.

The RPF check is associated with determining of a VRRP status. For example, an AND logical operation is set for the RPF check of the network device and the determining of the VRRP status of the network device. The RPF check is first performed, or the determining of the VRRP status is first performed. For example, when succeeding in the RPF check and determining that the status of the network device 621-1 in the VRRP is Master, the network device 621-1 determines that the network device 621-1 is the master root node. When succeeding in the RPF check and determining that the status of the network device 621-1 in the VRRP is Backup, the network device 621-1 determines that the network device 621-1 is the backup root node, and does not replicate or send the multicast packet to a downstream leaf node. When an interface of the network device receives a packet, an RPF check is performed on the multicast packet, and the VRRP status is determined, to determine to send or discard a received multicast data stream, thereby avoiding resource waste caused by further processing of the multicast data stream by the network device.

When the network device 621-1 serving as the master root node fails or a link between the network device 621-1 and the server 610 fails, the multicast data stream from the server 610 cannot be transmitted to the terminal device 640 through a transmission path the network device 621-1, the network device 622-1, the network device 623-1, the network device 634-1, the network device 635-1, and the network device 636. In this case, the network device 621-2 switches the role of the network device 621-2 from the backup root node to the master root node. The network device 621-2 receives a second multicast packet from the server 610, and the network device 621-2 may send the second multicast packet to the network device 622-2 based on the role of the master root node. Therefore, the second multicast packet reaches the terminal device 640 along a transmission path the network device 621-2, the network device 622-2, the network device 623-2, the network device 634-2, the network device 635-2, and the network device 636. This ensures that the terminal device 640 can receive a multicast data stream to which the first multicast packet and the second multicast packet belong, thereby ensuring network reliability.

In addition, the packet sending method provided in embodiments of this application may be further applied to an MPLS scenario. The following describes in detail two application scenarios: a single multicast domain and crossing multicast domains.

First, a case in which an MPLS technology is used to transmit a packet in a single multicast domain is described.

Still refer to FIG. 5. When the MPLS technology is used to transmit a packet, a P2MP tunnel or an MPLS P2MP tunnel may be established between a plurality of network devices in the multicast domain 520 based on a next-generation multicast virtual private network (NG-MVPN) technology. For example, a P2MP tunnel may be established based on the Multipoint Label Distribution Protocol (mLDP) or the Resource Reservation Protocol-Traffic Engineering (RSVP-TE).

In this embodiment, the multicast domain 520 is established based on the NG-MVPN technology. Therefore, to facilitate packet transmission, a tunnel may be established between nodes before packet transmission. Specifically, one tunnel may be established between the network device 521-1 and the network device 526, and another tunnel may be established between the network device 521-2 and the network device 526. The two tunnels may be P2MP tunnels, or may be traffic engineering (TE) P2MP tunnels.

In this embodiment, the network device 521-1 and the network device 521-2 may form a VRRP group. The following provides a description by using an example in which the network device 521-1 is a first multicast root node whose role is a master root node, and the network device 521-2 is a second multicast root node whose role is a backup root node.

Similar to the foregoing embodiment, in this embodiment, the network device 521-1 receives a first multicast packet sent by the server 510, and sends the first multicast packet to the network device 526 based on the VRRP status of the network device 521-1 being the master root node. The network device 521-2 receives the first multicast packet sent by the server 510, and discards the first multicast packet based on the role of the network device 521-2 being the backup root node. When the network device 521-1 fails or a link between the network device 521-1 and the server 510 fails, the network device 521-2 may switch the VRRP status of the network device 521-2 to the master root node, to send a second multicast packet to the network device 526. This ensures that the terminal device 530 can receive a multicast data stream to which the first multicast packet and the second multicast packet belong, thereby ensuring network reliability. For a specific packet sending process, refer to the foregoing descriptions. Details are not described herein.

An RPF check is associated with determining of a VRRP status. For example, an AND logical operation is set for the RPF check of the network device and the determining of the VRRP status of the network device. The RPF check is first performed, or the determining of the VRRP status is first performed. For example, when succeeding in the RPF check and determining that the status of the network device 521-1 in the VRRP is Master, the network device 521-1 determines that the network device 521-1 is the master root node. When succeeding in the RPF check and determining that the status of the network device 521-2 in the VRRP is Backup, the network device 521-2 determines that the network device 521-2 is the backup root node, and does not replicate or send the multicast packet to a downstream leaf node. When an interface of the network device receives a packet, an RPF check is performed on the multicast packet, and the VRRP status is determined, to determine to send or discard a received multicast data stream, thereby avoiding resource waste caused by further processing of the multicast data stream by the network device.

Similarly, similar to the foregoing embodiment, the network device 521-1 and the network device 521-2 in this embodiment may also perform an RPF check. For a specific RPF check process, refer to the foregoing descriptions. Details are not described herein.

The following describes an application scenario in which a packet is transmitted across multicast domains by using the MPLS technology.

Still refer to FIG. 6. Similar to the previous embodiment, in this embodiment, a point-to-multipoint P2MP tunnel may be established between a plurality of network devices in the first multicast domain 620 and the second multicast domain 630 based on an NG-MVPN technology. For example, a P2MP tunnel may be established based on mLDP or RSVP-TE.

In this embodiment, the first multicast domain 620 and the second multicast domain 630 are established based on the NG-MVPN technology. To facilitate cross-domain packet transmission, a tunnel is established between nodes before sending of a first multicast packet and/or a second multicast packet. Specifically, a tunnel may be established between the network device 621-1 and the network device 623-1, a tunnel may be established between the network device 621-2 and the network device 623-2, a tunnel may be established between the network device 623-1 and the network device 636, and a tunnel may be established between the network device 623-2 and the network device 636. The four tunnels may be MPLS P2MP tunnels. In addition, in an example, tunnel stitching may be further configured on the network device 623-1, so that two tunnels from the network device 621-1 to the network device 623-1 and from the network device 623-1 to the network device 636 are combined into one long cross-domain tunnel from the network device 621-1 to the network device 636; and tunnel stitching may be further configured on the network device 623-2, so that two tunnels from the network device 621-2 to the network device 623-2 and from the network device 623-2 to the network device 636 are combined into one long cross-domain tunnel from the network device 621-2 to the network device 636. In this way, a VRRP group does not need to be configured between the network device 623-1 and the network device 623-2, thereby saving a network resource.

In this embodiment, the network device 621-1 and the network device 621-2 form a VRRP group. The following provides a description by using an example in which the network device 621-1 is a first multicast root node whose role is a master root node, and the network device 621-2 is a second multicast root node whose role is a backup root node.

Similar to the foregoing embodiment, in this embodiment, the network device 621-1 may receive a first multicast packet sent by the server 610, and send the first multicast packet to the network device 636 based on the role of the network device 621-1 being the master root node. The network device 621-2 may receive the first multicast packet sent by the server 610, and discard the first multicast packet based on the role of the network device 621-2 being the backup root node. When the network device 621-1 fails or a link between the network device 621-1 and the server 610 fails, the network device 621-2 may change the role of the network device 621-2 to the master root node, to send a second multicast packet to the network device 636. This ensures that the terminal device 640 can receive a multicast data stream to which the first multicast packet and the second multicast packet belong, thereby ensuring network reliability. For a specific packet sending process, refer to the foregoing descriptions. Details are not described herein.

An RPF check is associated with determining of a VRRP status. For example, an AND logical operation is set for the RPF check of the network device and the determining of the VRRP status of the network device. The RPF check is first performed, or the determining of the VRRP status is first performed. For example, when succeeding in the RPF check and determining that the status of the network device 621-1 in the VRRP is Master, the network device 621-1 determines that the network device 621-1 is the master root node. When succeeding in the RPF check and determining that the status of the network device 621-1 in the VRRP is Backup, the network device 621-1 determines that the network device 621-1 is the backup root node, and does not replicate or send the multicast packet to a downstream leaf node. When an interface of the network device receives a packet, an RPF check is performed on the multicast packet, and the VRRP status is determined, to determine to send or discard a received multicast data stream, thereby avoiding resource waste caused by further processing of the multicast data stream by the network device.

Figure 7:
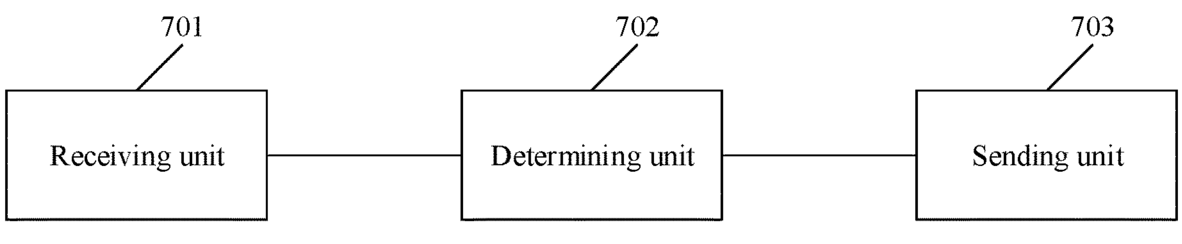
FIG. 7 is a schematic diagram of a structure of an apparatus according to an embodiment of this application.

Refer to FIG. 7. An embodiment of this application further provides an apparatus 700. The apparatus 700 may be disposed on a first multicast root node, and is configured to perform corresponding operations performed by the first multicast root node in operations S301 and S302 in the embodiment shown in FIG. 3. As shown in FIG. 7, the apparatus may include a receiving unit 701, a determining unit 702, and a sending unit 703. The receiving unit 701 may be configured to perform a corresponding operation performed by the first multicast root node in operation S301 in the embodiment shown in FIG. 3. The determining unit 702 and the sending unit 703 may be configured to perform corresponding operations performed by the first multicast root node in operation S302 in the embodiment shown in FIG. 3.

Specifically, the receiving unit 701 may be configured to receive a first multicast packet from a specified multicast source, where the first multicast root node and a second multicast root node belong to a same VRRP group. The determining unit 702 may be configured to determine that the first multicast root node is a master root node. The sending unit 703 may be configured to send the first multicast packet to a first node based on the determining, by the determining unit, that the first multicast root node is the master root node.

Optionally, an address of the first multicast root node is different from an address of the second multicast root node.

Optionally, the determining unit 702 is further configured to: before the first multicast root node sends the first multicast packet to the first node, determine that an interface for receiving the first multicast packet is the same as an inbound interface corresponding to a first forwarding entry. The first forwarding entry is a forwarding entry corresponding to an address in the first multicast packet.

Optionally, the determining unit 702 is specifically configured to determine, based on a master state of the first multicast root node, that the first multicast root node is the master root node.

Optionally, the determining unit 702 is specifically configured to: when an interface of the first multicast root node receives the first multicast packet, determine, by the first multicast root node based on determining that the interface for receiving the first multicast packet is the same as an inbound interface corresponding to a second forwarding entry and based on a master state of the first multicast root node, that the first multicast root node is the master root node.

Optionally, the determining unit 702 is specifically configured to: when the first multicast root node succeeds in an RPF check, determine that the first multicast root node is in a master state.

The apparatus 700 shown in FIG. 7 may perform corresponding operations performed by the first multicast root node in the method in the foregoing embodiment. The first multicast root node may receive the first multicast packet, and send the first multicast packet to the first node based on a role of the first multicast root node, to implement normal transmission of a packet data stream.

Figure 8:
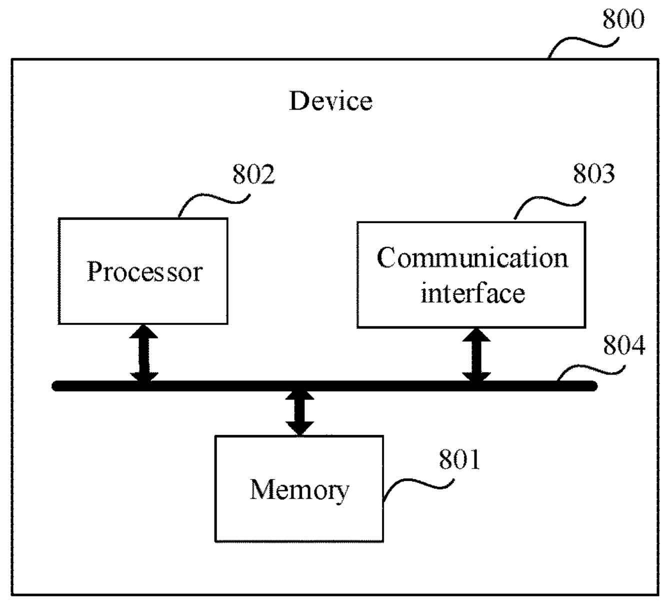
FIG. 8 is a schematic diagram of a structure of a device according to an embodiment of this application.

Refer to FIG. 8. An embodiment of this application provides a device 800. The device 800 may implement a function of the first multicast root node in the embodiment shown in FIG. 3. The device 800 includes a memory 801, a processor 802, and a communication interface 803.

The memory 801 is configured to store instructions or program code. When the embodiment shown in FIG. 7 is implemented, and the units described in the embodiment of FIG. 7 are implemented by software, software or program code required for performing a function of the receiving unit 701, the determining unit 702, or the sending unit 703 in FIG. 7 is stored in the memory 801.

The processor 802 is configured to execute the instructions in the memory 801, to perform the foregoing method applied to FIG. 2, for example, the packet sending method of the network device 311 in the embodiment, the network device 521-1 in the embodiment shown in FIG. 5, or the network device 621-1 in the embodiment shown in FIG. 6.

The communication interface 803 is configured to perform communication, for example, receive a multicast packet sent by a specified multicast source, and send the multicast packet to another network device.

The memory 801, the processor 802, and the communication interface 803 are connected to each other through a bus 804. The bus 804 may be a peripheral component interconnect (PCI) bus, an extended industry standard architecture (EISA) bus, or the like. The bus may be classified into an address bus, a data bus, a control bus, and the like.

For ease of representation, only one bold line is used for representation in FIG. 8, but this does not mean that there is only one bus or only one type of bus.

In a specific embodiment, the communication interface 803 is configured to receive a first multicast packet from the specified multicast source, and send the first multicast packet to a first node.

The processor 802 determines that the first multicast root node is a master root node and a second multicast root node is a backup root node. For a detailed processing process of the processor 802, refer to S301 and S302 in the embodiment shown in FIG. 3. Details are not described herein.

Figure 9:
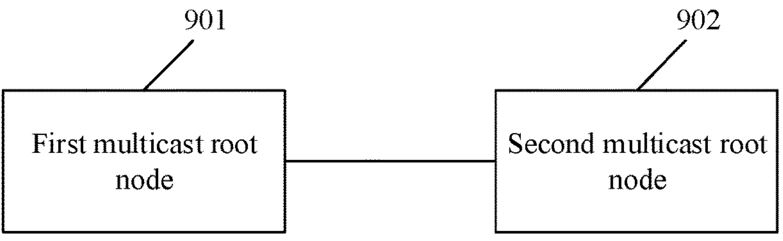
FIG. 9 is a schematic diagram of a structure of a multicast packet sending system according to an embodiment of this application.

Refer to FIG. 9. An embodiment of this application further provides a multicast packet sending system 900. The system 900 may include a first multicast root node 901 and a second multicast root node 902. The first multicast root node 901 and the second multicast root node 902 belong to a same VRRP group. The first multicast root node 901 is configured to perform corresponding operations performed by the first multicast root node in operation S301 and operation S302 in the embodiment shown in FIG. 3. The second multicast root node 902 is configured to perform corresponding operations performed by the second multicast root node in operation S301 and operation S302 in the embodiment shown in FIG. 3.

Specifically, the first multicast root node 901 is configured to receive a first multicast packet from a specified multicast source, and send the first multicast packet to a first node based on a fact that the first multicast root node is a master root node. The second multicast root node 902 is configured to receive a second multicast packet from the specified multicast source, and discard the second multicast packet based on a fact that the second multicast root node is a backup root node, where the first multicast packet and the second multicast packet include same multicast data.

Optionally, an address of the first multicast root node 901 is different from an address of the second multicast root node 902.

Optionally, the first multicast root node 901 is further configured to: before sending the first multicast packet to the first node, determine, by the first multicast root node 901, that an interface for receiving the first multicast packet is the same as an inbound interface corresponding to a first forwarding entry, where the first forwarding entry is a forwarding entry corresponding to an address in the first multicast packet.

Optionally, the first multicast root node 901 is specifically configured to determine, by the first multicast root node 901 based on a VRRP status of the first multicast root node 901 being a master state, that the first multicast root node 901 is the master root node.

Optionally, the second multicast root node 902 is configured to: before discarding the second multicast packet, determine that an interface for receiving the second multicast packet is the same as an inbound interface corresponding to a second forwarding entry, where the second forwarding entry is a forwarding entry corresponding to an address in the second multicast packet.

Optionally, the second multicast root node 902 is specifically configured to determine, by the second multicast root node 902 based on a VRRP status of the second multicast root node 902 being a backup state, that the second multicast root node 902 is the backup root node.

Optionally, the first multicast root node 901 is specifically configured to: when an interface of the first multicast root node 901 receives the first multicast packet, determine, by the first multicast root node 901 based on determining that the interface for receiving the first multicast packet is the same as an inbound interface corresponding to a third forwarding entry and based on a VRRP status of the first multicast root node being a master state, that the first multicast root node 901 is the master root node, where the third forwarding entry is a forwarding entry corresponding to an address in the first multicast packet.

Optionally, the second multicast root node 902 is specifically configured to: when an interface of the second multicast root node 902 receives the second multicast packet, determine, by the second multicast root node 902 based on determining that the interface for receiving the second multicast packet is the same as an inbound interface corresponding to a fourth forwarding entry and based on a VRRP status of the second multicast root node 902 being a backup state, that the second multicast root node 902 is the backup root node, where the fourth forwarding entry is a forwarding entry corresponding to an address in the second multicast packet.

Optionally, the second multicast root node 902 is further configured to send, by the second multicast root node 902, a received third multicast packet to a second node based on an update of the second multicast root node 902 to the master state and based on a failure of the first multicast root node 901 or a failure of a link between the first multicast root node 901 and the specified multicast source, where the third multicast packet and the second multicast packet belong to a same multicast stream.

Optionally, for the first multicast root node 901, being based on a fact that the first multicast root node 901 is a master root node includes: when the first multicast root node 901 succeeds in an RPF check, determining that the first multicast root node 901 is the master root node.

Optionally, for the second multicast root node 902, being based on a fact that the second multicast root node 902 is a backup root node includes: when the second multicast root node 902 succeeds in an RPF check, determining that the second multicast root node 902 is the backup root node.

Optionally, that the first multicast root node 901 sends the first multicast packet to a first node includes: The first multicast root node 901 processes the first multicast packet into a BIER packet. The first multicast root node 901 is a first BFIR, and the second multicast root node 902 is a second BFIR. The first multicast root node 901 sends the BIER packet to the first node.

Optionally, that the first multicast root node 901 sends the first multicast packet to a first node includes: The first multicast root node 901 processes the first multicast packet into an MPLS multicast packet. An MPLS P2MP tunnel is established between the first multicast root node 901 and the first node, and an MPLS P2MP tunnel is established between the second multicast root node 902 and the first node.

The system 900 shown in FIG. 9 may perform corresponding operations performed by the first multicast root node and the second multicast root node in the method in the foregoing embodiment. The first multicast root node may receive the first multicast packet, and send the first multicast packet to the first node based on a role of the first multicast root node being the master root node. The second multicast root node may receive the second multicast packet, and discard the second multicast packet based on a role of the second multicast root node being the backup root node. A network bandwidth resource is saved on a basis of normal transmission of a packet data stream.

An embodiment of this application further provides a computer-readable storage medium. The computer-readable storage medium includes a program. When the program is run on a computer, the computer may be enabled to perform the multicast packet sending method applied to the first multicast root node in the method in FIG. 3.

An embodiment of this application further provides a computer-readable storage medium. The computer-readable storage medium includes a program. When the program is run on a computer, the computer may be enabled to perform the method applied to either the first multicast root node or the second multicast root node in the method in FIG. 3.

In this specification, the claims, and the accompanying drawings of this application, terms "first", "second", "third", "fourth", and the like (if existent) are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of operations or units is not necessarily limited to those clearly listed operations or units, but may include other operations or units that are not clearly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the operations of the method described in embodiments of this application. The storage medium includes any medium that can store program code, for example, a universal serial bus (USB) flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

The objectives, technical solutions, and beneficial effects of the present invention are further described in detail in the foregoing specific embodiments. It should be understood that the foregoing descriptions are merely specific embodiments of the present invention.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A multicast packet sending method, wherein the method comprises:

receiving, by a first multicast root node, a first multicast packet from a specified multicast source;

receiving, by a second multicast root node, a second multicast packet from the specified multicast source, wherein the first multicast root node and the second multicast root node belong to a same virtual router redundancy protocol (VRRP) group, and the first multicast packet and the second multicast packet comprise same multicast data;

sending, by the first multicast root node, the first multicast packet to a first node based on the first multicast root node having a status as a master root node in the VRRP group; and discarding, by the second multicast root node, the second multicast packet based on the second multicast root node making a determination of a status of the second multicast root node as a backup root node in the VRRP group.

2. The method according to claim 1, wherein an address of the first multicast root node is different from an address of the second multicast root node.

3. The method according to claim 1, wherein before the sending, by the first multicast root node, the first multicast packet to the first node, the method further comprises:

determining, by the first multicast root node, that an interface for receiving the first multicast packet is the same as an inbound interface corresponding to a first forwarding entry, wherein the first forwarding entry is a forwarding entry corresponding to an address in the first multicast packet.

4. The method according to claim 1, further comprising: determining, by the first multicast root node based on a VRRP status of the first multicast root node being a master state, that the first multicast root node is the master root node.

5. The method according to claim 1, wherein before the discarding, by the second multicast root node, the second multicast packet, the method further comprises:

determining, by the second multicast root node, that an interface for receiving the second multicast packet is the same as an inbound interface corresponding to a second forwarding entry, wherein the second forwarding entry is a forwarding entry corresponding to an address in the second multicast packet.

6. The method according to claim 1, further comprising: determining, by the second multicast root node based on a VRRP status of the second multicast root node being a backup state, that the second multicast root node is the backup root node.

7. The method according to claim 1, further comprising: when an interface of the first multicast root node receives the first multicast packet, determining, by the first multicast root node based on determining that the interface for receiving the first multicast packet is the same as an inbound interface corresponding to a third forwarding entry and based on a VRRP status of the first multicast root node being a master state, that the first multicast root node is the master root node, wherein the third forwarding entry is a forwarding entry corresponding to an address in the first multicast packet.

8. The method according to claim 1, further comprising: when an interface of the second multicast root node receives the second multicast packet, determining, by the second multicast root node based on determining that the interface for receiving the second multicast packet is the same as an inbound interface corresponding to a fourth forwarding entry and based on a VRRP status of the second multicast root node being a backup state, that the second multicast root node is the backup root node, wherein the fourth forwarding entry is a forwarding entry corresponding to an address in the second multicast packet.

9. The method according to claim 1, wherein the method further comprises:

updating, by the second multicast root node, the status to a master state based on a failure of the first multicast root node or a failure of a link between the first multicast root node and the specified multicast source; and sending a received third multicast packet to a second node, wherein the third multicast packet and the second multicast packet belong to a same multicast stream.

10. The method according to claim 1, further comprising: when the first multicast root node succeeds in a reverse path forwarding (RPF) check, determining that the first multicast root node is the master root node.

11. A multicast packet sending system, comprising:

a first multicast root node configured to receive a first multicast packet from a specified multicast source, and send the first multicast packet to a first node based on the first multicast root node having a status as a master root node in a virtual router redundancy protocol (VRRP) group; and a second multicast root node configured to receive a second multicast packet from the specified multicast source, and discard the second multicast packet based on the second multicast root node making a determination of a status of the second multicast root node as a backup root node in the VRRP group, wherein the first multicast root node and the second multicast root node belong to a same VRRP group, wherein the first multicast packet and the second multicast packet comprise same multicast data.

12. The system according to claim 11, wherein an address of the first multicast root node is different from an address of the second multicast root node.

13. The system according to claim 11, wherein the first multicast root node is further configured to:

before sending the first multicast packet to the first node, determine, by the first multicast root node, that an interface for receiving the first multicast packet is the same as an inbound interface corresponding to a first forwarding entry, wherein the first forwarding entry is a forwarding entry corresponding to an address in the first multicast packet.

14. The system according to claim 11, wherein the first multicast root node is further configured to:

determine, by the first multicast root node based on a VRRP status of the first multicast root node being a master state, that the first multicast root node is the master root node.

15. The system according to claim 11, wherein the second multicast root node is configured to:

before discarding the second multicast packet, determine that an interface for receiving the second multicast packet is the same as an inbound interface corresponding to a second forwarding entry, wherein the second forwarding entry is a forwarding entry corresponding to an address in the second multicast packet.

16. The system according to claim 11, wherein the second multicast root node is further configured to:

determine, by the second multicast root node based on a VRRP status of the second multicast root node being a backup state, that the second multicast root node is the backup root node.

17. The system according to claim 11, wherein the first multicast root node is further configured to:

when an interface of the first multicast root node receives the first multicast packet, determine, by the first multicast root node based on determining that the interface for receiving the first multicast packet is the same as an inbound interface corresponding to a third forwarding entry and based on a VRRP status of the first multicast root node being a master state, that the first multicast root node is the master root node, wherein the third forwarding entry is a forwarding entry corresponding to an address in the first multicast packet.

18. The system according to claim 11, wherein the second multicast root node is further configured to:

when an interface of the second multicast root node receives the second multicast packet, determine, by the second multicast root node based on determining that the interface for receiving the second multicast packet is the same as an inbound interface corresponding to a fourth forwarding entry and based on a VRRP status of the second multicast root node being a backup state, that the second multicast root node is the backup root node, wherein the fourth forwarding entry is a forwarding entry corresponding to an address in the second multicast packet.

19. The system according to claim 11, wherein the second multicast root node is further configured to:

send, by the second multicast root node, a received third multicast packet to a second node based on an update of the second multicast root node to a master state and based on a failure of the first multicast root node or a failure of a link between the first multicast root node and the specified multicast source, wherein the third multicast packet and the second multicast packet belong to a same multicast stream.

20. The system according to claim 11, wherein the first multicast root node is further configured to:

when the first multicast root node succeeds in a reverse path forwarding (RPF) check, determining that the first multicast root node is the master root node.

* * * * *